Figure 3:
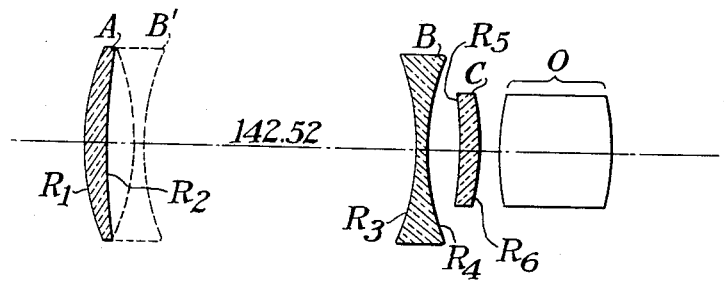

July 11, 1939.    J. G. CAPSTAFF ET AL    2,165,341
PHOTOGRAPHIC OBJECTIVE
Filed July 28, 1936    2 Sheets-Sheet 1
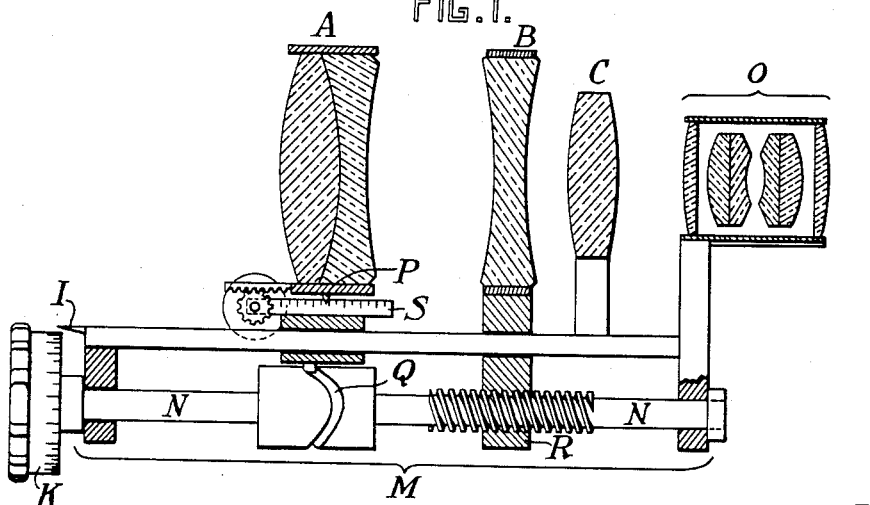
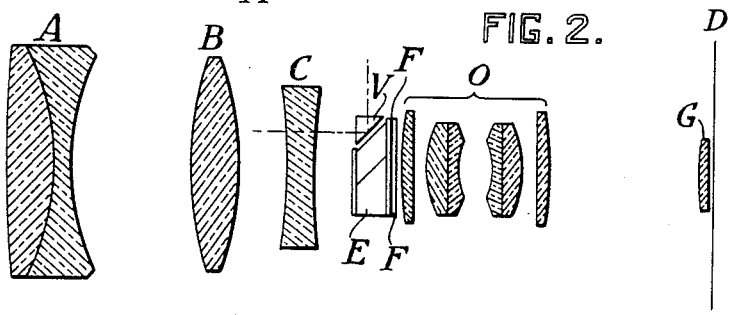
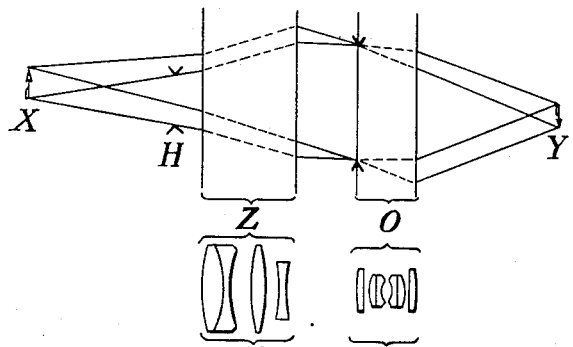
PART A
FIG. 5.
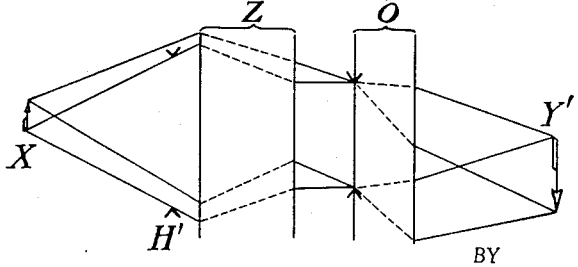
PART B
INVENTORS
John G. Capstaff
Oran E. Miller
BY
ATTORNEYS July 11, 1939.                J. G. CAPSTAFF ET AL                2,165,341
                                PHOTOGRAPHIC OBJECTIVE
                              Filed July 28, 1936            2 Sheets-Sheet 2

| LENS | GLASS (D-LINE) | FOCAL LENGTH | THICKNESS | RADII |
|------|----------------|--------------|-----------|-------|
| A | N = 1.62011 | F = +300 | 10.0 | $R_1$ = +150.00 |
| | | | | $R_2$ = +754.66 |
| B | N = 1.51500 | F = −100 | 5.0 | $R_3$ = −100.74 |
| | | | | $R_4$ = +100.74 |
| C | N = 1.62011 | F = +300 | 10.0 | $R_5$ = −754.66 |
| | | | | $R_6$ = −150.00 |

| LENS | GLASS (D-LINE) | FOCAL LENGTH | THICKNESS | RADII |
|------|----------------|--------------|-----------|-------|
| A | N = 1.62011 | F = −152.7 | 5.0 | $R_1$ = +110.0 |
| | | | | $R_2$ = +50.0 |
| B | N = 1.62011 | F = +110. | 20.0 | $R_3$ = +97.35 |
| | | | | $R_4$ = −250.00 |
| C | N = 1.62011 | F = −152.7 | 5.0 | $R_5$ = +110.00 |
| | | | | $R_6$ = +50.00 |

INVENTORS
John G. Capstaff
Oran E. Miller
BY
ATTORNEYS

Patented July 11, 1939

2,165,341

UNITED STATES PATENT OFFICE 2,165,341

PHOTOGRAPHIC OBJECTIVE

John G. Capstaff and Oran E. Miller, Rochester, N. Y., assignors, by mesne assignments, to Eastman Kodak Company, Rochester, N. Y., a corporation of New Jersey Application July 28, 1936, Serial No. 93,026

18 Claims. (Cl. 88—57)

Our invention relates to optical systems suitable for photographic purposes. More particularly it relates to optical systems of continuously variable focal length particularly adapted for use as a photographic objective so that the pictures taken therewith may be made to appear to have been taken from different distances or continuously changing distances from the subject, without the necessity of altering the distance between the camera and the subject being photographed.

The general object of our invention is to provide an optical system the equivalent focal length of which is variable in a manner which allows the distance between the image and subject and the distance between the image and the rear element of the system to remain substantially constant.

A more particular object of our invention is to provide an attachment for a photographic objective which together with said objective will form an optical system of this type.

Another object of our invention is to provide an attachment of the type mentioned which will direct substantially collimated light to the photographic objective with which it is used, so that the optical system will be particularly suitable for the taking of color motion pictures on lenticular film.

Another object of our invention is to provide an attachment of the type mentioned, the operation of which will not affect the effective relative aperture of the optical system as a whole.

A further object of our invention is to provide a simple means for separately focusing said attachment so that it is not necessary to change the focus of the camera objective for photographic subjects at different distances from the camera.

A further object of our invention is to provide an attachment of the type mentioned having a scale mounted thereon to indicate effective focal length of the optical system as the magnification of said attachment is varied.

Many optical systems of this general type are known to the prior art. Usually these systems comprise two components such as two lenses or an ordinary camera objective with one auxiliary lens, forming a system of variable magnification which requires that both components move with respect to the image plane. The effective relative aperture of such systems is variable unless provision is made to alter the camera diaphragm accordingly. It may be noted that front element focusing objectives such as those used on some ordinary snapshot cameras change their effective focal length without altering the distance between the rear element and the image plane. However the purpose of such objectives is merely to focus on subjects at different distances from the camera. With our invention, the distance between the camera objective and the image plane and the distance between the camera and the subject both may remain fixed while the magnification of the image varies in a continuous manner. Also with our invention, it is unnecessary to alter the distance between the camera objective and the image plane when focusing on subjects at different distances from the camera. Due to depth of focus of a lens, a subject is said to be at a substantially fixed distance therefrom as long as it remains within the limits defining the depth of field.

Inasmuch as our invention may take the form of an auxiliary attachment which itself contains all of the mechanism and features necessary for varying the magnification of the image, for adjusting the focus of the optical system and for testing the focus and framing of the scene, the camera with which it is to be used may have a very much simplified construction. Auxiliary lenses of various focal lengths are no longer necessary; hence, the lens turret may be eliminated. The camera objective may be rigidly mounted focused on infinity; thus the usual expensive focusing mount is rendered unnecessary. Also, the view finder means incorporated in the attachment serves satisfactorily for testing the focus of the image and the framing of the subject being photographed. This eliminates the necessity of incorporating a means for sliding the lens to one side of the camera or inserting a reflex binder behind said lens, so that the image may be studied on a ground glass. All of these features cooperate to form a compact camera which may be mounted in a simplified form of housing or blimp for taking sound motion pictures.

Figure 4:
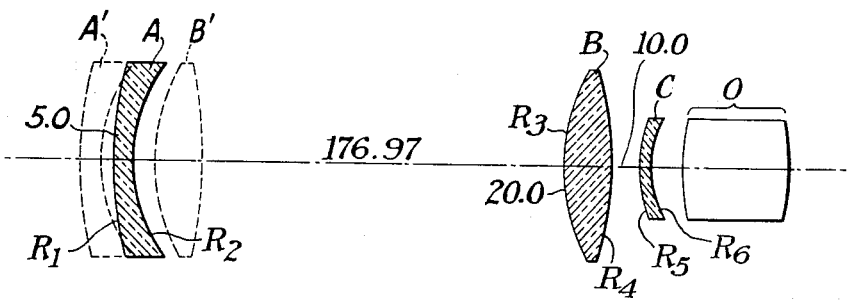

Several suitable arrangements with which our invention may be practised are illustrated in the accompanying drawings. Figure 1 schematically shows one form of our proposed optical system and one form of mechanical arrangement for moving and controlling the motion of the various components of the optical system. Figure 2 shows another form of the optical system and a means for adapting the system for taking color pictures on lenticular film. Figures 3 and 4 show other useful arrangements of the collimating attachment. Figure 5 illustrates the optical principle underlying our invention.

Referring to Figure 1, the group of lenses O represents an ordinary camera objective of any suitable type, such for instance as the one illustrated in Figure 4 of the U. S. Patent Frederick 1,685,600 granted September 25, 1928, to which reference may also be made for the proper positioning of the filters when lenticulated film is employed.

In accordance with our invention, an enlarging or reducing collimator represented by lenses A, B, and C is placed in front of the camera objective O. It is to be understood that the term "collimator" necessarily implies that all rays emanating from one point in the plane upon which the collimator is focused emerge substantially parallel.

The collimator shown as comprising the lenses A, B and C may be of various forms. When the front lens A is positive and the component comprising the lenses B and C is negative, as shown in Figure 1, the collimator acts as a telephoto attachment. If the distance between the lenses A and C is varied continuously and the distance between the lenses B and C is also varied in a manner which will cause the collimator to fulfill its function as such, the effective focal length of the system will be varied in a continuous manner. An optical system which will accomplish this is known to those skilled in the art as a "zoom" lens. It may be defined as a system which permits the magnification to be varied in a continuous manner while the image remains focused in the same plane. The fact that the camera objective remains separately focused on one point (preferably on infinity) is a very important difference of our invention over the zoom lenses heretofore known.

The collimating arrangement of our invention may take the form shown in Figure 2, in which case the front lens A is negative and the lenses B and C form a positive component. Figure 2 also shows means whereby the optical system may be adapted to take color pictures on lenticular film. The multicolor (preferably tricolor) filter which is used for this purpose is placed in the plane F which is preferably immediately in front of the camera objective O. If desired, a compensating collimating lens G is placed just in front of the film plane D to make the filter F appear at infinity.

Thus as is well known, the objective O and the lens G form an optical system whose front focal point is substantially in the filter plane F and whose back focal point is substantially in the film plane D. When this arrangement is used with lenticular film, we prefer to employ a beam splitter E mounted in front of and in contact with the filter F. The beam splitter E, preferably called an antifringer, eliminates the parallax between two or more of the color bands which comprise the filter F. The antifringer is described and claimed in the copending applications, Numbers 703,268 and 69,316 filed December 20, 1933, and March 17, 1936, respectively by John G. Capstaff, one of the present inventors.

If convenient, the lens C, the antifringer E, the filter F and the front element of the objective O, may all be cemented together, thus eliminating several air-glass surfaces. Obviously, the front surface of the objective O and the rear surface of the lens C must be plane in this case.

The construction of the beam splitter or antifringer E is such that all of the light beam which would otherwise enter the camera objective O is not utilized. A light deflecting member such as a prism V may be conveniently provided so that the part of the beam which would otherwise be wasted, will be reflected for use for view finding or for focusing purposes or both. The fact that the light beam is collimated as it emerges from the lens C renders such a view finding arrangement feasible, since any and every portion of the light beam at this point is substantially representative of the whole of the subject being photographed, and permits focusing, since the change of focus is accomplished by movement of only that part of optical system which is in front of the prism V.

The reducing collimator shown in Figure 2 is not confined to use with lenticular film nor is it the only form suitable for such a purpose. The lens G, filter F, antifringer E and view-finding means V may be employed collectively (or separately if the occasion warrants) with any suitable collimator including those of the enlarging type illustrated in Figure 1, and those described below.

As shown in Figure 3, our collimating attachment may have a form in which the lenses A and C are positive lenses of substantially equal and relatively weak power and lens B is a relatively strong negative lens. Lenses A and C may be positive menisci with their concave surfaces facing each other and lens B may be a double concave negative lens having a power approximately 3 times that of either of the positive components. As lens B is moved along its axis from the neighborhood of A toward the neighborhood of C, the collimator changes in a continuous manner from a reducing to an enlarging collimator and at some intermediate point the magnification factor is unity. In most cases, it will also be necessary to vary the distance between the outer components A and C to maintain collimation of the emergent beam.

The specific example given in Figure 3 represents the condition when the collimator is focused on infinity, i. e., represents an afocal system. When the axial separation of lenses A and B is 142.52 mm. and that of lenses B and C is 10.00 mm., the collimator has a magnification factor of 1.89. When lens B is moved to the position $B^1$ and the separations of lenses A and B and lenses B and C are 10.00 mm. and 142.52 mm. respectively, the magnification factor is .53. In accordance with our invention the optical system may be focused on a subject at a given distance by merely adjusting one component of the collimating attachment. For example, to focus the collimator on a subject 10 meters away, the lens A must be moved along its optic axis about 9 mm. increasing the distance between lens A and lens B by that amount. It is obvious to those skilled in the art that the focusing scale computed for lens A alone is the focusing scale for the collimator. This increment of 9 mm. is just the amount which a lens identical to A would be moved to change its focus from infinity to 10 meters.

Similar results may be obtained by using a collimating arrangement as shown in Figure 4 wherein the outer lenses A and C are relatively weak negative lenses and lens B is a relatively strong positive one. In this case, the collimator changes from a reducing to an enlarging one when the component B is moved forward instead of backward as in the previous case.

In the specific example shown in Figure 4, with the lenses A and B in the positions shown by solid lines, the separation of lenses A and B being 176.97 mm. and the separation of lenses B and C being 10.00 mm., the magnification factor is .54. When lenses A and B are moved to the positions A¹ and B¹ shown by broken lines, the separation of lenses A and B being 20.24 mm., the separation of lenses B and C being 176.97 mm., the magnification factor is 1.98. Focusing may be accomplished by adjusting lens A according to a focusing scale computed for said lens A alone.

As shown in Figure 1, lens A is mounted rigidly (with provision for zero correction) to an index pointer P which moves along a focusing scale S. As pointed out above previously, focusing of the collimator and of the whole optical system is confined to an adjustment of lens A relative to scale S as indicated by index P, since the calibration of the scale S is independent of the degree of magnification, i. e., independent of what stage of zooming is occupied at the time the focusing adjustment is made. At least one of the components A, B or C may remain fixed with respect to the objective O and the film plane D. It is usually more convenient to have the component C so mounted. Any suitable means represented by M may be provided for moving the scale S (which carries component A with it) and the component B in spaced relation to each other and to the component C to give the zooming effect. In Figure 1, one suitable arrangement of the mechanical means M is shown as comprising a rotatable member N carrying a helical cam Q and a screw R which respectively control the motion of the focusing scale S and the component B. The member N is rotated and controlled by a knob K in accordance with a scale marked on said knob. This latter scale may be in arbitrary units and may be considered as a measure of the effective focal length or the degree of magnification of the system. It is obvious that the screw R may be replaced by another helical cam. In fact, Q and R may comprise any of the well known mechanical control means consisting of various types of cams, screws and gears.

The constructions shown on the several figures are merely illustrative of the various forms which our invention may take and it is to be understood that the several lens components may consist of more than one lens element in order to provide the usual corrections.

The numerical data for a collimator constructed according to the present invention, as illustrated in Figure 3, are given below. In the table and on the accompanying drawings the successive radii of curvature, counting from the front, are called $R_1$, $R_2$, etc., the sign $+$ denoting that the surface is convex toward the incident light, and $-$ that it is concave toward the same. The axial thicknesses of successive lenses are designated $T_1$ to $T_3$. There are also given in the table focal lengths of each of the components. The glass is defined in terms of the index of refraction for the D line.

| Lens | Glass | Focal length | Radii | Thickness |
|---|---|---|---|---|
| A | D=1.62011 | +300 mm. | $R_1$=+150.00 mm.<br>$R_2$=+754.66<br>$R_3$=−100.74 | $T_1$=10.0 mm. |
| B | D=1.51500 | −100 | $R_4$=+100.74<br>$R_5$=−745.66 | $T_2$=5.0 |
| C | D=1.62011 | +300 | $R_6$=−150.00 | $T_3$=10.0 |

The numerical data for the arrangement shown in Figure 4 are given below and employ the same notations as above.

| Lens | Glass | Focal length | Radii | Thickness |
|---|---|---|---|---|
| A | D=1.62011 | −152.7 mm. | $R_1$=+110.00 mm.<br>$R_2$=+50.00<br>$R_3$=+97.35 | $T_1$=5.0 mm. |
| B | D=1.62011 | +100 | $R_4$=−250.00<br>$R_5$=+110.00 | $T_2$=20.00 |
| C | D=1.62011 | −152.7 | $R_6$=+50.00 | $T_3$=5.0 |

The lenses employed in the collimating attachment of our invention are preferably of sufficient diameter so that the light coming from each point on the subject at all times substantially fills the entrance pupil of the camera objective O. In the operation of this zoom device, the effective relative aperture of the system remains constant and hence, it is not necessary to vary the camera diaphragm while zooming in order to maintain proper exposure. This important feature appears to be due to the following two conditions which substantially obtain in our invention. First the diameter of the entrance pupil of the whole optical system comprising the collimator and the camera objective, increases in direct proportion to the magnification factor of the collimator. The exit pupil of said system is that of the objective O alone and remains constant during zooming. Second, it is obvious that the diameter of an area of film covered by the image of any given area of subject also increases in direct proportion to the magnification factor. Thus, the amount of light reaching any point of the image which is focused on the film, is independent of the degree of magnification of the collimating attachment and is practically constant. Figure 5 indicates schematically the method of operation of the optical system. Referring first to Figure 5, Part A, the light from each point on the subject X submits a cone of light to the collimator Z which is shown as two vertical lines. The dimensions of said cone of light is defined by the diameter of the entrance pupil H of the optical system and by the distance from subject X to said system.

The light is collimated by the collimator Z and directed toward objective O which in turn focuses the beam forming an image.

In accordance with our invention, the magnification factor of collimator Z is varied as shown in Figure 5, Part B. This increases the angle of divergence of the collimated beam as it emerges from the collimator Z. Hence, in this case, when the light is focused by objective O it forms an image Y' of increased magnification.

It is well known to those skilled in the art that the entrance pupil of any optical system may be considered as the image of the limiting diaphragm of the system formed by all of lenses of said system which precede said limiting diaphragm. When the lenses of the collimating attachment are of sufficient diameter, the camera diaphragm located in the camera objective O forms the limiting diaphragm. Thus as was pointed out previously, the diameter of the entrance pupil H varies in proportion to the magnification factor of the collimator and the amount of light reaching any point on the image remains substantially constant.

It is to be understood that in all of the figures we have purposely made the showing largely diagrammatic or schematic so that the optical arrangement constituting the real features of our invention may be clear. The present showing is, however, sufficient for anyone skilled in the art to make and use the invention.

Also, although we have shown and described several forms which our invention may take, many variations are possible and will immediately suggest themselves to those skilled in this particular art. We do not wish to be limited to the details herein set forth, but intend to include in our invention all modifications which fall within the scope of the appended claims.

What we claim and desire to secure by Letters Patent of the United States is:

1. An optical system of variable equivalent focal length, of substantially constant back focus and of substantially constant effective relative aperture comprising an ordinary photographic objective adapted for use with lenticular film and focused to have its image plane and back focal plane substantially coincident, a multicolor banded filter mounted immediately in front of said objective, a lens immediately in front of said image plane to cause said filter to appear infinitely distant, a beam splitter mounted in front of said multicolor filter to provide the same perspective to at least two of the color bands of said filter, a view finder light accepting means comprising a reflector mounted adjacent to said beam splitter, an auxiliary optical device mounted detachably in front of and coaxial with said beam splitter, comprising at least three lenses adapted to collect light incident thereon and direct it in a collimated beam to said beam splitter and to said view finder light accepting means, said lenses being mounted for relative axial movement in a predetermined manner to maintain said collimation and to produce continuously variable magnification without substantially affecting the front focus of the system, mechanical means for imparting said predetermined relative movement to said lenses, means for indicating the position of said lenses as controlled by said mechanical means and manually actuatable means for independently adjusting one of said lenses for focusing the system.

2. An optical system of variable equivalent focal length adapted for taking color pictures on lenticular film, comprising an ordinary photographic objective set to focus collimated light, a collimator of continuously variable magnification and constant focusing power mounted in front of said objective said collimator comprising at least three lenses, one of which is negative, one of which is positive and at least two of which are axially movable, a multicolor banded filter mounted between said collimator and said objective and a beam splitter mounted between said filter and said collimator to receive collimated light, to divide it into a plurality of beams and to direct each beam through a separate band of said filter.

3. An optical system of variable equivalent focal length adapted for taking color pictures on lenticular film, comprising an ordinary photographic objective set to focus collimated light, a collimator of continuously variable magnification and constant focusing power mounted in front of said objective said collimator comprising at least three lenses, one of which is negative, one of which is positive and at least two of which are axially movable, a multicolor banded filter between said collimator and said objective, a beam splitter mounted between said filter and said collimator to receive collimated light, to divide it into a plurality of beams and to direct each beam through a separate band of said filter, and a view finding light accepting means mounted adjacent to said beam splitter to receive a portion of the collimated beam from said collimator.

4. An optical system of variable equivalent focal length and of substantially constant back focus comprising an ordinary photographic objective set to focus collimated light, a collimator of continuously variable magnification and constant focusing power mounted in front of said objective said collimator comprising at least three lenses, one of which is negative, one of which is positive and at least two of which are axially movable and a view finder light accepting means between said collimator and said objective to receive a portion of the collimated beam from said collimator.

5. An optical system of variable equivalent focal length and of substantially constant back focus, comprising an ordinary photographic objective set to focus collimated light, an optical device in front of said objective comprising at least three lenses at least one of which is negative and at least one of which is positive, adapted to collect light and to direct it in a collimated beam to said objective, said lenses being individually and axially movable in a predetermined manner relative to each other to maintain this collimation and to produce continuously variable magnification without substantially affecting the front focus of the system, and manually actuatable means for independently adjusting one of said lenses for focusing the system.

6. An optical system of variable equivalent focal length and of substantially constant back focus, comprising an ordinary photographic objective set to focus collimated light, an optical device in front of said objective comprising at least three lenses at least one of which is negative and at least one of which is positive, adapted to collect light and to direct it in a collimated beam to said objective, the separations between said lenses being adjustable to produce continuously variable magnification without substantially affecting the front focus of the system and without affecting this collimation and mechanical means for controlling movement of said lenses relative to each other, comprising a rotatable member and guide members attached thereto.

7. An optical system of variable equivalent length and of substantially constant back focus, comprising an ordinary photographic objective set to focus collimated light, a collimator of variable magnification and constant focusing power mounted in front of said objective, said collimator comprising at least three individually movable lenses at least one of which is negative and at least one of which is positive, mechanical means including a rotatable member and guide members for controlling the movement of said lenses relative to each other, and means for indicating the position of said lenses as controlled by the rotatable member.

8. An optical system of variable equivalent focal length and of substantially constant back focus, comprising an ordinary photographic objective set to focus collimated light and an optical device in front of said objective, said optical device comprising at least three lenses at least one of which is negative and at least one of which is positive, adapted to collect light and to direct it in a collimated beam to said objective, said lenses being so correlated optically that predetermined axial movement relative to each other will vary the magnification without substantially affecting the front focus of the system and means for moving said lenses in such predetermined manner.

9. An optical system of variable equivalent focal length comprising an ordinary photographic objective set to focus collimated light and an auxiliary optical device detachably mounted in front of said objective, the auxiliary device comprising at least three lenses at least one of which is negative and at least one of which is positive, arranged to direct collimated light to said objective, said lenses being individually movable relative to each other to produce continuously variable magnification without affecting the front focus of the system or the collimation.

10. An optical system of variable equivalent focal length, comprising an ordinary photographic objective set to focus collimated light and a collimator of continuously variable magnification and predetermined constant focusing power mounted in front of said objective, said collimator comprising at least three lenses, one of which is negative, one of which is positive and at least two of which are axially movable.

11. An attachment for a photographic objective comprising at least three lenses adapted to collect light and to direct it in a collimated beam to said objective, said collimator comprising at least three lenses, one of which is negative, one of which is positive and at least two of which are axially movable, at least one of said lenses being axially movable in a predetermined manner to produce continuously variable magnification without substantially affecting the front focus of the system and without affecting the collimation.

12. An optical attachment for use in front of a photographic objective set to focus collimated light comprising two lens components of substantially equal power positioned on opposite sides of a third component having a greater and opposite power, the three components being so spaced that light from a given plane incident on said attachment emerges collimated therefrom, said third component being axially movable between said two outer components to vary the magnification factor of said attachment and the spacing of said outer components being slightly variable to maintain collimation of the emergent beam.

13. A collimating lens system of variable magnification comprising two outer components of similar power and one inner component of opposite power to the two outer components, the components being so shaped that adjustment of the inner component along its axis varies the magnification factor of the system and compensating adjustment of the axial spacing of the outer components maintains collimation, and a mount for the system including means for moving said components axially in predetermined relation to give said adjustments.

14. An optical system of variable equivalent focal length for forming an image of a subject at a substantially fixed distance comprising an objective set to focus collimated light into the plane of said image and an attachment between the subject and the objective for collimating light from the subject and for transmitting this collimated light to the objective, said attachment consisting of at least three lenses, at least one of which is positive and at least one of which is negative axially spaced with respect to their relative powers to produce said collimation and axially adjustable in a continuous manner also with respect to their relative powers to vary the magnification without affecting said collimation.

15. An optical system according to claim 14, in which a view finder light accepting means is positioned between the attachment and the objective to receive a small portion of the collimated light beam which portion, being collimated, is representative of all of the beam.

16. An optical system according to claim 14, in which a multicolor banded filter adapted for use with lenticular film in taking color pictures is positioned between the attachment and the objective to filter the light which, being collimated, includes in the portion passing through each band of the filter, light rays representative of every point of the subject.

17. An optical system of variable equivalent focal length for forming an image of a subject at a substantially fixed distance comprising an objective set to focus light of fixed vergence into the plane of said image and an attachment between the subject and the objective for accepting light from each point of the subject, and for projecting it with said fixed vergence to the objective, said attachment comprising at least three lenses, at least one of which is positive and at least one of which is negative, axially spaced with respect to their relative powers to produce said fixed vergence and axially adjustable in a continuous manner also with respect to their relative powers to vary the magnification without affecting said fixed vergence.

18. A lens attachment for affecting light from a subject at a substantially fixed distance and for use with a camera objective adapted to focus collimated light, said attachment comprising at least three positive and negative lenses axially spaced with respect to their relative powers to focus the light from said subject to a given vergence and axially adjustable in a continuous manner also with respect to their relative powers to vary the magnification without affecting said vergence, mechanical means for producing said continuous axial adjustment and means for separately adjusting the relative axial position of the lenses for adjusting said given vergence whereby this vergence may be adjusted to collimation for light from said subject when the attachment is used with said camera objective.

JOHN G. CAPSTAFF.
ORAN E. MILLER.